United States Patent [19]

Swaim

[11] 4,433,853
[45] Feb. 28, 1984

[54] CONVERTIBLE TRAILER HITCH

[76] Inventor: Dennis L. Swaim, Rte. #4, Box 323, Ottumwa, Iowa 25501

[21] Appl. No.: 380,516

[22] Filed: May 21, 1982

[51] Int. Cl.³ .............................................. B60D 1/00
[52] U.S. Cl. ............................. 280/415 R; 280/423 B; 280/491 D
[58] Field of Search .......... 280/415 R, 415 A, 415 B, 280/423 R, 423 A, 423 B, 491 B, 491 D, 491 E

[56] References Cited

U.S. PATENT DOCUMENTS

| | | | |
|---|---|---|---|
| 3,698,740 | 10/1972 | Chisholm et al. | 280/491 E |
| 3,796,443 | 3/1974 | Crutchfield | 280/423 R |
| 3,810,661 | 5/1974 | Lowrance | 280/415 B |
| 3,815,936 | 6/1974 | Oaks | 280/415 A |
| 3,840,252 | 10/1974 | Jocoy | 280/415 A |
| 3,889,978 | 6/1975 | Kann | 280/415 B |
| 3,918,744 | 11/1975 | Gay | 280/415 B |
| 3,955,831 | 5/1976 | Whitchurch | 280/423 R |
| 4,261,594 | 4/1981 | Corbett | 280/415 R |

*Primary Examiner*—John A. Pekar
*Attorney, Agent, or Firm*—Simmons, Perrine, Albright & Ellwood

[57] ABSTRACT

A convertible hitch for towing a trailer or the like includes a gooseneck arm for use as a hitch of that type. The gooseneck arm is braced by an A-frame tongue, and the hitch is converted to the bumper type by detaching the forward end of the tongue from the gooseneck arm, swinging the same down and attaching it to the rear of the towing vehicle in the usual manner. The gooseneck arm in turn is foldable back upon itself against the forward end of the trailer. All the foregoing is accomplished simply by the removal or insertion of several pins so that the hitch can be readily converted from one form to the other.

5 Claims, 6 Drawing Figures

CONVERTIBLE TRAILER HITCH

BACKGROUND OF THE INVENTION

There are essentially two types of hitches for towing a load behind a vehicle, the "bumper" type and the "gooseneck" type. In the former, a tow bar assembly or tongue is attached to the tow and to the rear bumper or adjacent under portion of the car or truck. In the latter, in order to avoid the tow from lifting weight from the front wheels of the towing vehicle, a long, cranked arm extends from the tow over and down to the bed of a pickup truck, for instance, and is connected there at a point just above or forward of the truck's rear axle.

So far as known, however, hitches of these two types are not readily interchangeable, that is to say, from bumper to gooseneck type and vice versa. The gooseneck hitch in U.S. Pat. No. 3,810,661, for instance, is removably attached to a bumper-type tow bar and hence must be totally removed in order to use the latter. The same is essentially true of the hitches in U.S. Pat. Nos. 3,815,936, 3,796,443, 3,840,252, and 3,889,978. U.S. Pat. No. 3,955,831 discloses a rather elaborate arrangement using at the same time a gooseneck type hitch and a pair of links connecting the tow to the bumper of the towing vehicle but the links themselves are not suitable for use alone and they and the gooseneck would have to be detached before a regular bumper-type hitch could be employed. U.S. Pat. Nos. 3,698,740 and 4,261,594 illustrate convertible hitches employing separate detachable portions, each of which is to be removed before the other can be fitted. Finally, U.S. Pat. No. 3,918,744 discloses a gooseneck type hitch whose height can be adjusted for use either on the bed of a truck or on its bumper. But when employed at the bumper the gooseneck, among other disadvantages, impairs the turning radius of the tow.

Accordingly, the primary object of the present invention is the provision of a hitch for towing a load which can be readily converted back and forth between conventional bumper and gooseneck types.

SUMMARY OF THE INVENTION

Essentially the hitch of the present invention, when used in its gooseneck version, employs a diagonal brace in the form of an A-frame tongue pivoted at its lower two ends to the tow and removably pinned at its upper end intermediate the ends of the horizontal arm of the gooseneck. For use in bumper form, the tongue is detached at its upper end, swung down and attached to serve as a bumper hitch while the gooseneck arm is folded up upon itself and horizontally swung back against the tow out of the way. Other and further features of the invention will become apparent from the drawings and the more detailed description which follows.

DETAILED DESCRIPTION OF THE PREFERRED EMBODIMENT

Figure 6:
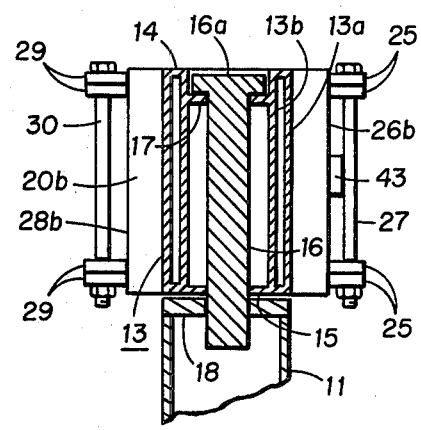
FIG. 6 is a vertical sectional view taken along the lines 6—6 of FIG. 3.

The hitch of the invention, generally designated at 10, consists of a vertical tubular post 11 of, say, 6 inch pipe, whose lower end is affixed in appropriate manner to the forward end 12 of the tow TE. The latter can obviously be of any number of types other than the flatbed form illustrated in FIGS. 1 and 2. A double wall sleeve 13 (see FIG. 6) is formed from short lengths of pipe 13a and 13b held in concentric relation by welded in annular spacers 14 and 15 at the upper and lower ends of the sleeve 13. A hinge pin 16 having an upper head 16a is inserted down through the spacers 14 and 15, the head 16a being supported by an annular retainer 17 previously welded within the wall 13b. The sleeve wall 13b closely abuts the periphery of the pin head 16a and the lower spacer 15 extends radially inwards to closely abut the shank of the pin 16. Then an annular plate 18 is slipped over the lower end of the pin 16 and welded to the latter. The foregoing assembly is placed atop the post 11 and the plate 18 welded to it. About the exterior of the sleeve 13 is welded the boxed in and bifurcated rear end of the horizontal arm, generally designated at 20, of the gooseneck which may be conveniently fashioned from suitable rectangular tubing of, say, 12 inch by 8 inch cross-section. The forward end of the arm 20 is also boxed and bifurcated and welded about the exterior of the upper end of an upright tubular post 21 forming the vertical arm of the gooseneck and of material similar to that of the post 11, the posts 11 and 21 and the arm 20 thus lying in and partially bounding a common vertical plane. The lower end of the post 21 is fitted with a conventional ball socket, indicated at 22, which in turn receives a ball (not shown) secured to the bed 23 of the towing truck TR in the usual manner. The connection between the arm 20 and the post 21 is braced by a gusset plate 24.

Figure 4:
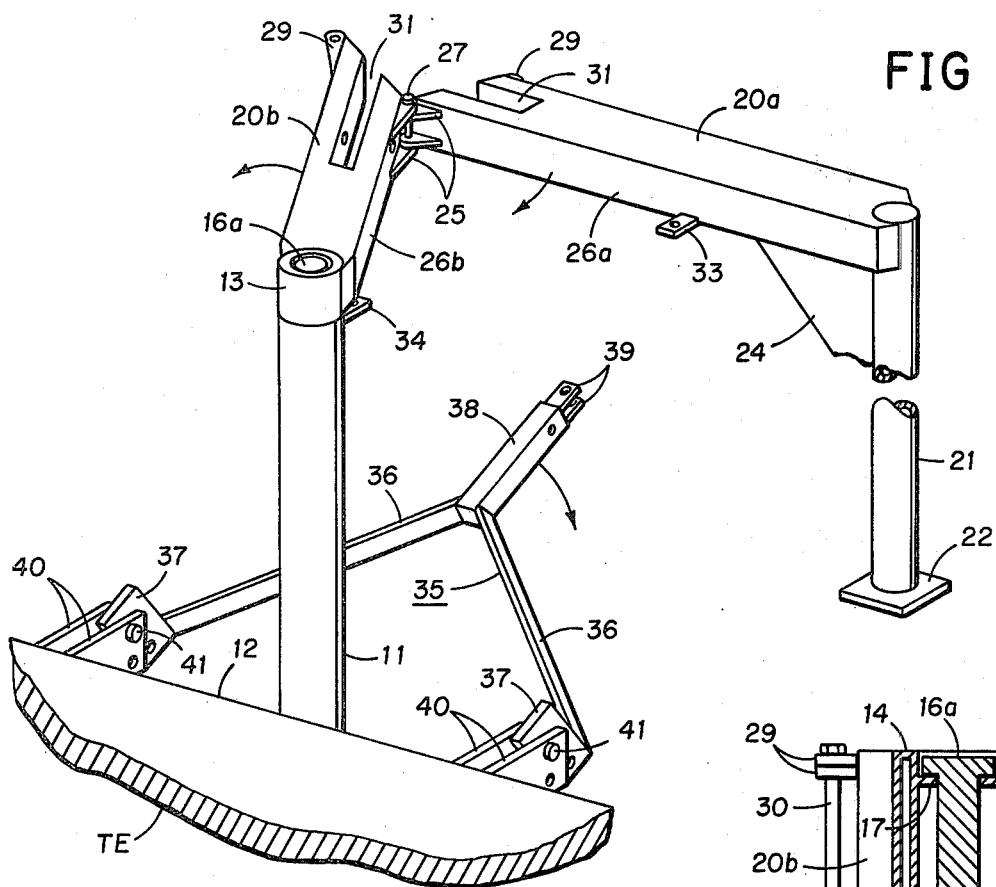
FIG. 4 is an isometric view as in FIG. 3 but showing the hitch in the process of being converted to its bumper form.
Figure 5:
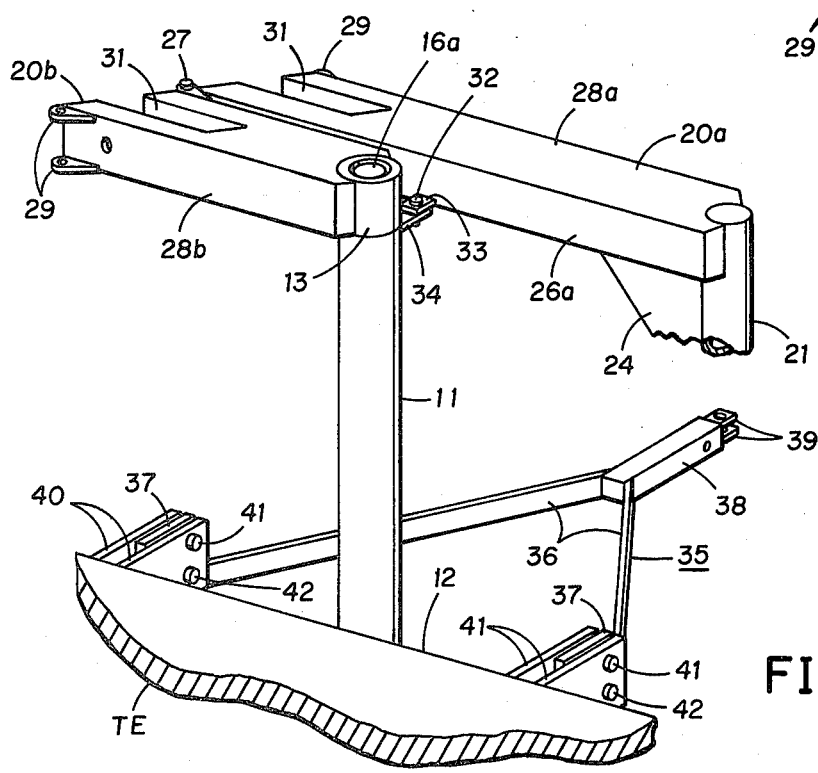
FIG. 5 is an isometric view showing the hitch finally in its bumper form.

The gooseneck arm 20 is formed in two parts, 20a and 20b, the junction between the two being along a vertical diagonal about midway of the arm 20. The two portions are pivoted for swinging movement in a horizontal plane relative to each other by means of two pairs of vertically spaced triangular hinge plates 25 on one pair of abutting arm side walls 26a and 26b and a fixed vertical hinge pin 27. The opposite pair of arm side walls 28a and 28b are fitted with like pairs of vertically spaced hinge plates 29 and a removable vertical hinge pin 30. The arm 20 is vertically and longitudinally slotted at 31 at the juncture between the two parts 20a and 20b, the slot 31 extending equally into each, and its sides and the abutting ends of the two parts 20a and 20b are boxed by suitable welded in plates, as indicated. Hence, when the two hinge pins 27 and 30 are in place the arm 20 is rigid, but when the pin 30 is removed, the two parts 20a and 20b can be folded back upon themselves and the two together swung in the same plane about the hinge pin 14 and against the forward end of the tow TE, as shown in FIGS. 4 and 5. The folded arm 20 is retained in the latter position by a removable pin 32 connecting a pair of tangs 33 and 34 welded to the arm side wall 26a and the forward face of the post 11 just below the sleeve 13.

Figure 1:
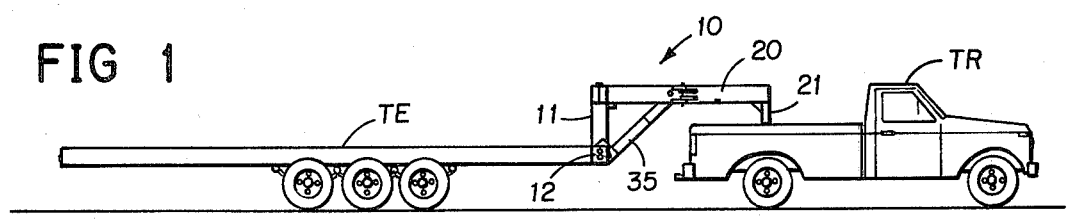
FIG. 1 is a side elevational view of a truck towing a trailer using the hitch of the invention in its gooseneck form.
Figure 2:
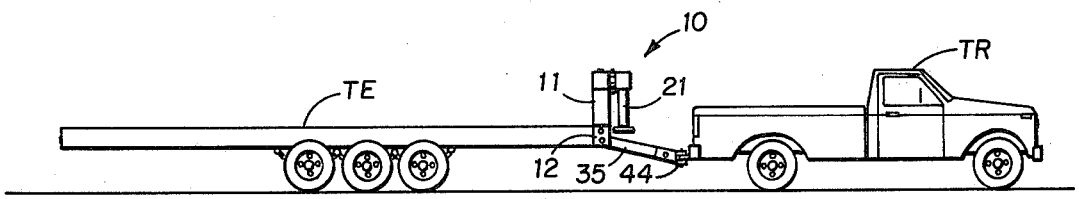
FIG. 2 is a side elevational view as in FIG. 1 but illustrating the hitch converted to its bumper form.
Figure 3:
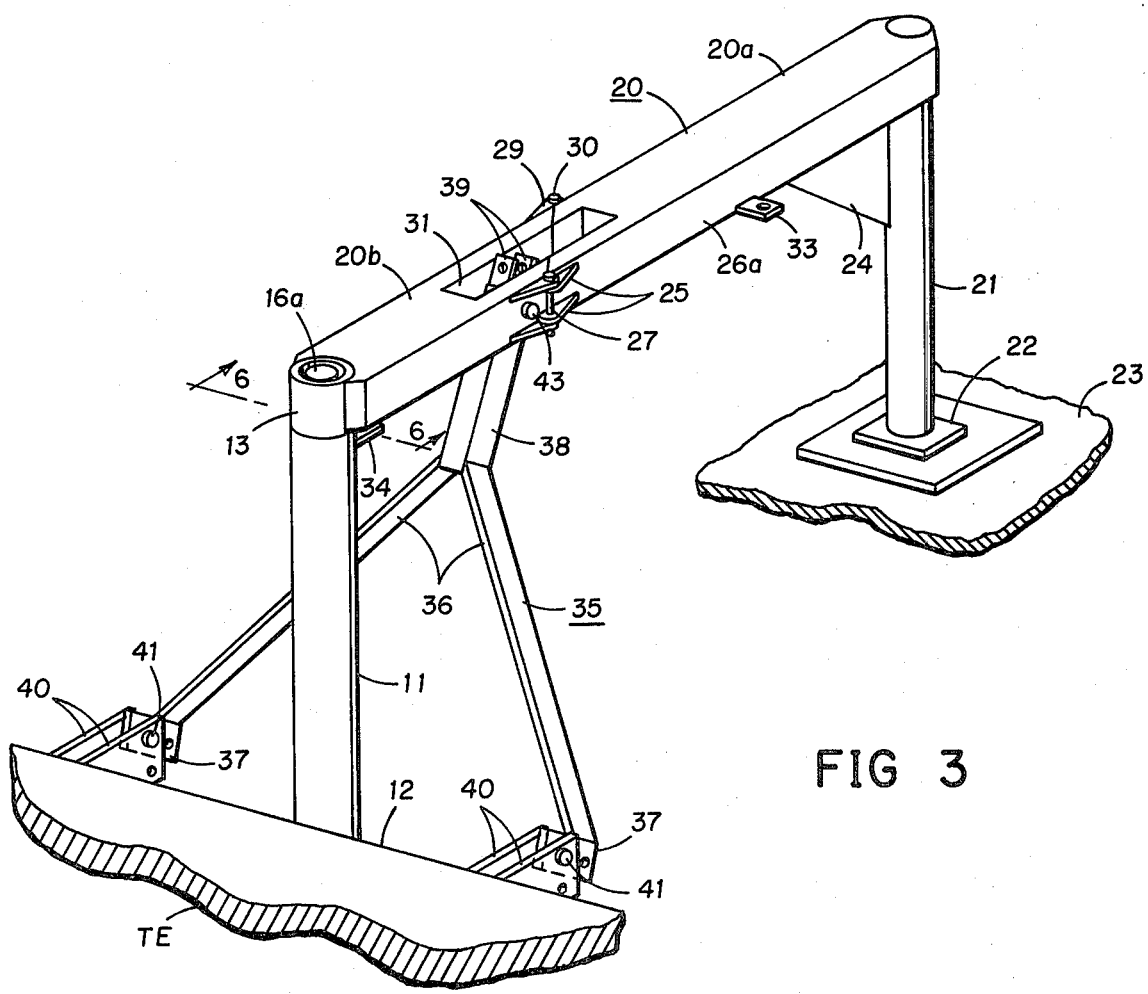
FIG. 3 is an isometric view of the hitch itself in its gooseneck form.

The arm 20 is braced by an A-frame tongue, generally indicated at 35, to the rear ends of whose splayed arms 36 are welded upstanding hinge brackets 37. The convergent ends of the arms 36 are joined by a forwardly extending neck 38 whose forward end in turn is fitted with a horizontal clevis 39, the neck 38 being sized to fit within the arm slot 31. The hinge brackets 37 are received in turn between two pairs of cleves 40, suitably attached to the forward end of the tow TE laterally outboard of the post 11, and secured by hinge pins 41 and lock pins 42. The pins 41 are permanently in place but the pins 42 are removable so that the tongue 35 can be swung up about the hinge pins 41 in the vertical plane of the gooseneck and secured in the arm slot 31 by a transverse removable pin 43 through the arm 20b (see FIG. 3). The hitch 10 is then in its gooseneck form as shown in FIGS. 1 and 3. By removing the pins 30 and 43, so that the arms 20a and 20b can be folded back upon themselves about the hinge pins 16 and 27 and secured against the tow TE with the pin 32, as previously explained, the tongue 35 can swing down about the hinge pins 41 and the pins 42 inserted to lock the tongue 35 to the cleves 40, whereby the hitch is in its bumper form as shown in FIGS. 2 and 5. The clevis 39 may be fitted with a conventional ball hitch socket 44 (see FIG. 2) for attachment to a ball stud at the rear of the truck TR.

In short, the invention provides a trailer hitch readily convertible between gooseneck and bumper modes without laboriously removing one set of parts and/or installing another. Removal or insertion of the pins 30, 32, 42 and 43 is all that is required to shift from one mode to the other. If desired, in order to accommodate different bed levels of various tow trucks and the like and to assist attaching and removing the ball socket 22 to and from the towing vehicle without elevating or depressing the front end of the tow, the post 21 could be readily formed of telescoping sections releasably locked to each other by suitable means. Accordingly, though the invention has been described in terms of a particular embodiment, being the best mode known of carrying out the invention, it is not limited to that embodiment alone. Accordingly, the following claims are to be read as encompassing all adaptations and modifications of the invention falling within its spirit and scope.

I claim:

1. In a convertible trailer hitch including a gooseneck arm having first and second arm members, the second arm member extending transversely from adjacent one end of the first arm member, the two arm members lying in and partially bounding a first plane, the second arm member including means for pivotally attaching its end remote from the first arm member to a towing vehicle, the improvement comprising: first pivot means for pivoting the other end of the first arm member to a towed vehicle for swinging movement of the first arm member in a second plane transversely of the first plane; and a brace member having one end removably attached to the first arm member intermediate said ends thereof, the other end of the brace member including second pivot means for pivoting the brace member to a trailer for swinging movement of at least a portion of the brace member in said first plane away from the first arm member when detached therefrom, said one end of the brace member including means for attaching the same to a towing vehicle in the vicinity of its rear bumper when the brace member is detached from the first arm member and swung as aforesaid, said other end of the brace member also including said means in conjunction with said second pivot means for rigidly attaching said other end of the brace member to a trailer when said one end of the brace member is attached to a towing vehicle as aforesaid.

2. The convertible hitch of claim 1 wherein the brace member comprises a tongue having a neck portion releasably securable to the first arm member as aforesaid and an adjoining splayed portion including a pair of diverging arms having their proximal ends secured to the neck portion and their distal ends provided with said second pivot means as aforesaid, said second pivot means being disposed laterally to each side of said first plane; and means incorporated in said second pivot means for locking the tongue to the second pivot means after the tongue is detached from the first arm member and swung to a selected position for attachment to a towing vehicle as aforesaid.

3. The convertible hitch of claim 1 or 2 wherein the first arm member comprises two portions having abutting ends when the portions are in a first position, said ends being releasably connected to each other for pivoting movement in said second plane of one of the portions relative to the other from said first position to a second position in which the two portions are folded upon each other, the two portions being thereafter swingable about the first pivot means to a third position transversely of said first plane; and means to retain the two portions in said third position.

4. The convertible hitch of claim 3 including a gooseneck arm supporting member lying in and further defining the boundary of said first plane, the supporting member having opposite ends one of which carries said first pivot means and the other of which ends is securable to a towed vehicle.

5. The convertible hitch of claim 4 including a slot extending longitudinally into and through each of the abutting ends of the two arm portions effective to receive therein said one end of the brace member and to releasably attach the same to the first arm member as aforesaid when said portions thereof are in said first position.

* * * * *